United States Patent
Larose

(10) Patent No.: US 9,213,823 B2
(45) Date of Patent: Dec. 15, 2015

(54) METHOD FOR INPUTTING A CODE USING A PORTABLE DEVICE, AND ASSOCIATED PORTABLE DEVICE

(75) Inventor: Cyril Larose, Rennes (FR)

(73) Assignee: ORANGE, Paris (FR)

( * ) Notice: Subject to any disclaimer, the term of this patent is extended or adjusted under 35 U.S.C. 154(b) by 96 days.

(21) Appl. No.: 14/005,454

(22) PCT Filed: Mar. 15, 2012

(86) PCT No.: PCT/FR2012/050543
§ 371 (c)(1),
(2), (4) Date: Nov. 25, 2013

(87) PCT Pub. No.: WO2012/123683
PCT Pub. Date: Sep. 20, 2012

(65) Prior Publication Data
US 2014/0090052 A1    Mar. 27, 2014

(30) Foreign Application Priority Data
Mar. 15, 2011   (FR) ...................................... 11 52075

(51) Int. Cl.
*G06F 7/04* (2006.01)
*G06F 21/36* (2013.01)
*H04M 1/67* (2006.01)
*G06F 21/34* (2013.01)

(52) U.S. Cl.
CPC ................. *G06F 21/36* (2013.01); *H04M 1/67* (2013.01); *G06F 21/34* (2013.01); *H04M 2250/12* (2013.01)

(58) Field of Classification Search
None
See application file for complete search history.

(56) References Cited

U.S. PATENT DOCUMENTS

| 7,647,849 B2 | 1/2010 | Miyake | |
| 2012/0026001 A1* | 2/2012 | Huang et al. | 340/689 |

FOREIGN PATENT DOCUMENTS

| CN | 101951439 | 1/2011 |
| KR | 1020040107055 | 12/2004 |

OTHER PUBLICATIONS

International Search Report dated May 21, 2012 for corresponding International Application No. PCT/FR2012/050543 filed Mar. 15, 2012, 12 pages.
International Preliminary Report on Patentability and English translation of the Written Opinion dated Sep. 17, 2013 for corresponding International Application No. PCT/FR2012/050543, filed Mar. 15, 2012.

* cited by examiner

*Primary Examiner* — Brandon Hoffman
(74) *Attorney, Agent, or Firm* — David D. Brush; Westerman, Champlin & Koehler, P.A.

(57) ABSTRACT

A method and apparatus are provided for entering a code using a portable device. The method includes measuring at least one angle of inclination of the portable device and generating an input code from the measured angle of inclination.

13 Claims, 3 Drawing Sheets

METHOD FOR INPUTTING A CODE USING A PORTABLE DEVICE, AND ASSOCIATED PORTABLE DEVICE

CROSS-REFERENCE TO RELATED APPLICATIONS

This Application is a Section 371 National Stage Application of International Application No. PCT/FR2012/050543, filed Mar. 15, 2012, which is incorporated by reference in its entirety and published as WO 2012/123683 on Sep. 20, 2012, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The invention relates to a method for inputting a code using a portable device and a portable device capable of implementing this method.

By way of illustrative examples, the present invention applies to the inputting of a security code for unlocking a device such as a mobile phone, to the inputting of a parental control code into a decoder by means of a remote control, or to the inputting of any other code able to be input by means of a portable device.

BACKGROUND OF THE DISCLOSURE

Many methods exist for inputting, using a portable device, a code, such as an unlocking code, allowing the device to be unlocked. The term "unlocking" is understood to mean any operation allowing the device to be changed from a locked state to an operational unlocked state, or the activation of one or more functionalities of the portable device. The portable device can be a mobile phone, a touch-sensitive multimedia tablet, or a remote control, for example a remote control of a television set, a remote control of a TV decoder, etc.

A first method consists in inputting a code, or a password, using a physical keyboard or even a virtual keyboard displayed on a touch-sensitive screen.

A second method consists in pressing a predefined series of keyboard keys, simultaneously or sequentially.

A third method consists in making a gesture on a touch-sensitive screen of the device using one or more fingers. This gesture can be a personal gesture, preconfigured by the user themselves, or even a gesture preconfigured by the manufacturer of the device. By way of illustrative example, mention may be made of an unlock bar for a touch-sensitive screen, such as described in document U.S. Pat. No. 7,647,849.

All these unlocking methods may prove to be unsuitable in certain circumstances. For example, in winter, if the user is wearing gloves, he or she must systematically remove them either to press the keys of the physical keyboard, these strokes requiring a certain precision of gesture, or to touch the touch-sensitive screen.

A need therefore exists for another method for inputting a code using a portable device, suitable for such circumstances.

SUMMARY

For this purpose, the invention relates to a method for inputting a code using a portable device, in which the following steps are executed by the device:

measurement of at least one angle of inclination of the portable device; and generation of an input code from the measured angle of inclination.

The invention thus allows a code to be input in a simple and fun manner, for example a code for unlocking the portable device, a PIN code or a parental control code, without the need to press keys of a physical keyboard or to touch a touch-sensitive screen. A user can thus enter the code by simply picking up and inclining the portable device.

In a particular embodiment, in the step of generation of the input code, in the event of it being determined that the measured angle lies within an angular range extending between $-PA°$ and $+PA°$, PA being a preset angle, a code is generated by calculating the integer part of the result of the sum of the measured angle $(\alpha;\beta)$ and of the angle PA, multiplied by a fraction 50/PA. In other words, the code is generated by calculating the integer part of $$\left((\alpha + PA) * \frac{50}{PA}\right),$$

where $\alpha$ represents the measured angle.

The code is preferably a two-figure code. If the measured angle is varied within the angular range between $-PA°$ and $+PA°$, exclusive of limits, a code varying between 00 et 99 is obtained. Thus, two-figure codes can be obtained by varying the inclination of the device in the angular range $]-PA°;+PA°[$.

Advantageously, in the event of it being determined that the measured angle is less than or equal to the lower limit $-PA°$ of the angular range, the code is set equal to 00.

Still advantageously, in the event of it being determined that the measured angle is greater than or equal to the upper limit $+PA°$ of the angular range, the code is set equal to 99.

Thus, even if the measured angle is outside the angular range $]-PA°;+PA°[$, a corresponding code is obtained.

In a particular embodiment, the portable device being represented by a plane, the measurement step comprises the measurement of a first angle of inclination of the portable device with respect to a first axis and the measurement of a second angle of inclination of the portable device with respect to a second axis.

In this case, the method makes it possible to generate two intermediate codes from the two measured angles of inclination. These two intermediate codes may be two-figure numerical values. A final code may then be formed, corresponding to the input code, by concatenation of the two intermediate codes generated.

The invention also relates to a method for unlocking a portable device, in which, an unlocking code being preconfigured, the following steps are provided:

inputting a code by implementing the method defined above;

comparing the input code with the preconfigured unlocking code; and unlocking the portable device if the comparison is positive.

The invention also relates to a portable device comprising:

means for measuring at least one angle of inclination of the portable device; and means for generating an input code based on a result of the measurement angle of inclination.

BRIEF DESCRIPTION OF THE DRAWINGS

The invention will be better understood by way of the following description of a particular embodiment of the method for inputting a code using a portable device according to the invention, and of a particular embodiment of a portable device able to implement this method, given with reference to the appended drawings in which.

DETAILED DESCRIPTION OF ILLUSTRATIVE EMBODIMENTS

The method for inputting a code according to the invention makes it possible to input a code using a portable device 1. In the particular example described here, it is a code for unlocking the portable device. The term "unlocking" is understood to mean an operation intended either to make the device 1 change from a locked state, in which use of the device 1 is not possible, to an unlocked state, in which the device 1 can be used, or to activate one or more functionalities of the device 1.

As a variant, the method according to the invention could be used to input a parental control code using a remote control, or a code for unlocking an item of equipment (TV decoder, TV set, etc.) using a remote control, or any other type of code.

Figure 1:
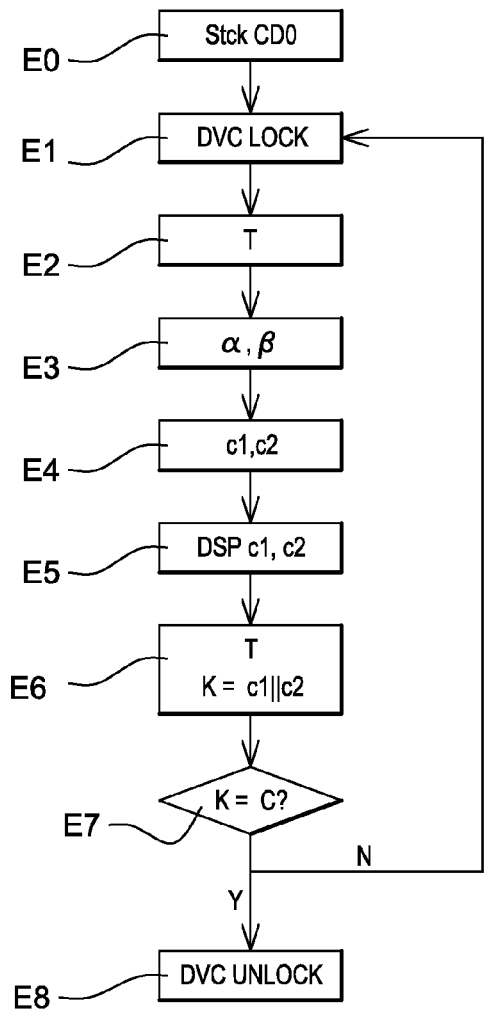
FIG. 1 shows a flow chart of the steps of the method for inputting a code, according to the particular embodiment described.

A particular embodiment of the method for inputting a code will now be described with reference to FIG. 1. In the particular exampled described here, the portable device 1 is a mobile phone equipped with a touch-sensitive display screen 10.

During a prior configuration step E0, a user records an unlocking code, here a four-figure code, denoted C, by inputting it using a virtual keyboard displayed on the touch-sensitive screen 10. The unlocking code C is here stored in an internal memory 11 of the portable device. As a variant, the unlocking code could be a code for unlocking a security card, in this case a SIM 3 card, connected to the portable device 1 and embedded in the latter. In this case, the PIN code for unlocking the SIM card would be stored in a memory 30 of the SIM 3 security card.

By way of an illustrative example, the unlocking code C stored in the memory 11 of the device 1 is "0831".

In a step E1, the portable device 1 is in a locked state. In this state, use of the portable device 1 is not possible.

When a user wishes to unlock the portable device 1, they perform a particular initial action to signal their wish to the device 1, in a step E2. In the particular example described here, this particular action is the user pressing a specific activation key T of the portable device 1. As a variant, it is possible to envision pressing any keyboard key (in the event of a device being equipped with a physical keyboard) a volume key, or even pressing a touch-sensitive screen (in the event of the device being equipped with a touch-sensitive screen). Once the particular action has been carried out, the device 1 changes to a state of waiting for a code K to be input by the user.

To input the code K, the user takes the portable device 1 in one hand and inclines it by a first angle with respect to a first reference axis x, and by a second angle with respect to a second reference axis Y, in a step E3, until a first and a second target angle corresponding to a target inclination position are reached. For the measurement of the angles of inclination, the device 1 is represented by a plane P. This plane P is for example the plane in which the screen of the device 1 lies.

The result of a measurement of the angle between the plane P and the x-axis is denoted $\alpha$ and the result of a measurement of the angle between the plane P and the y-axis is denoted $\beta$. In the particular example described here, the x- and y-axes are respectively two orthogonal axes defining a horizontal plane.

To each measured angle $\alpha$, $\beta$ corresponds an intermediate code c1, c2, respectively. In order to make each intermediate code c1, c2 vary in a numerical range of two-figure values, ranging from 00 to 99, the measurement of each angle $\alpha$ and $\beta$ must be performed in a predefined angular range between $-PA°$ and $+PA°$, PA being an angle value. In the particular example described here, the angle PA has a value of 45°. This angle PA may be configured by the user or preconfigured by the manufacturer of the device 1.

During the inclination step E3, a correspondence between the two measured angles $\alpha$ and $\beta$ and the two respective intermediate codes c1 and c2 is determined, in a step E4, with a calculation algorithm.

Figure 2:
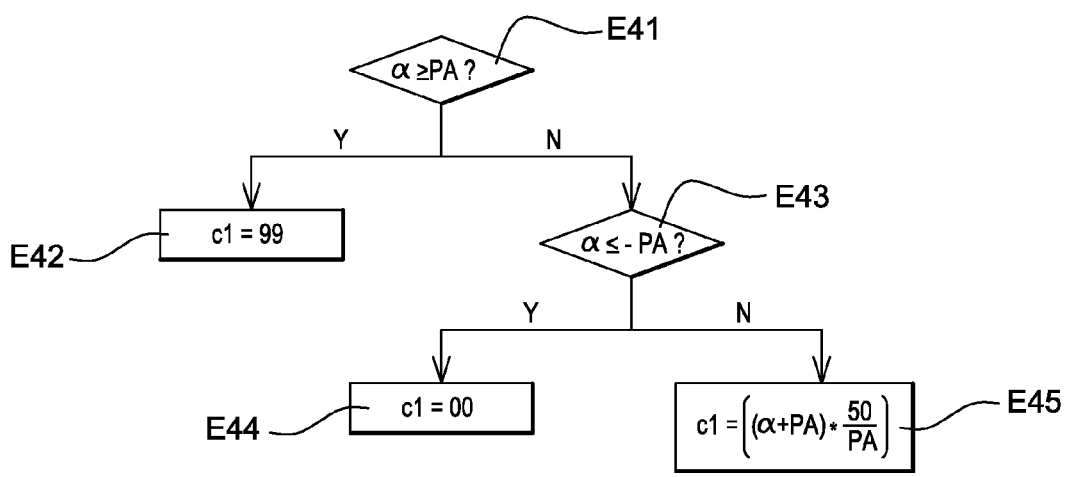
FIG. 2 shows a calculation algorithm implemented in the method in FIG. 1.

With reference to FIG. 2, a particular embodiment of this calculation algorithm is as follows:

for each measured angle $\alpha$ ($\beta$), it is determined whether the measured angle $\alpha$ ($\beta$) is greater than or equal to the angle $+PA°$, i.e. here 45°, in a test step E41;

if the test E41 is positive (branch Y in FIG. 2), or in other words if the measured angle is greater than 45°, then the code c1 (c2) is set equal to 99, in a step E42; if the test E41 is negative (branch N in FIG. 2), or in other words if the measured angle is less than 45°, then it is determined whether the measured angle $\alpha$ ($\beta$) is less than or equal to $-PA°$, i.e. here $-45°$, in a test step E43;

if the test E43 is positive (branch Y in FIG. 2), or in other words if the measured angle $\alpha$ ($\beta$) is less than or equal to $-PA°$, i.e. here $-45°$, then the code c1 (c2) is set equal to 00, in a step E44; and if the test E43 is negative (branch N in FIG. 2), or in other words if the measured angle $\alpha$ ($\beta$) is strictly greater than $-PA°$ (here) $-45°$ and strictly less than $+PA°$ (here $+45°$), then the code c1 (c2) is set equal to the integer part of the result of the sum of the measured angle $\alpha$ ($\beta$) and of the angle PA, multiplied by the fraction 50/PA (with PA having a value of 45 here) in a step E45. In other words:

$$c1 = \text{integer part}\left((\alpha + PA) * \frac{50}{PA}\right) = \left\lfloor (\alpha + PA) * \frac{50}{PA} \right\rfloor$$

$$c2 = \text{integer part}\left((\beta + PA) * \frac{50}{PA}\right) = \left\lfloor (\beta + PA) * \frac{50}{PA} \right\rfloor$$

where PA=45.

It will be noted that FIG. 2 shows the calculation algorithm implemented to generate a code c1 from a measured angle $\alpha$. A similar calculation algorithm is implemented to generate a code c2 from a measured angle $\beta$.

Thus, by varying the measured angles $\alpha$ and $\beta$, preferably between $-45°$ et $+45°$, the intermediate codes c1 and c2 respectively obtained vary between 00 and 99, each intermediate code c1, c2 being a two-figure code.

Figure 4A:
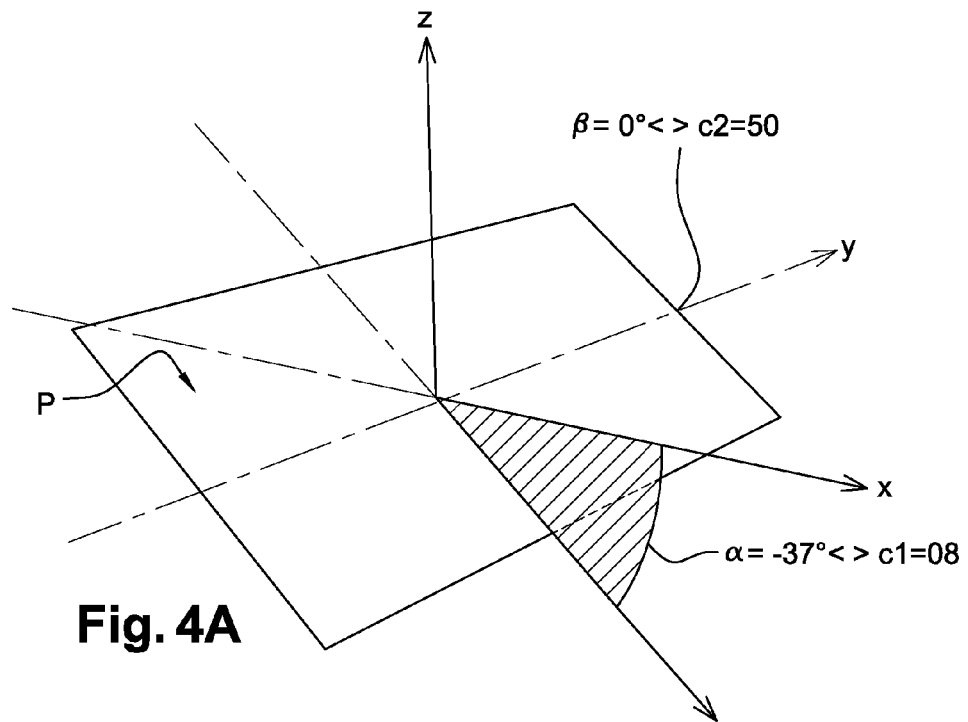
FIGS. 4A and 4B show schematic views of the portable device in FIG. 2 in an inclined position.
Figure 4B:
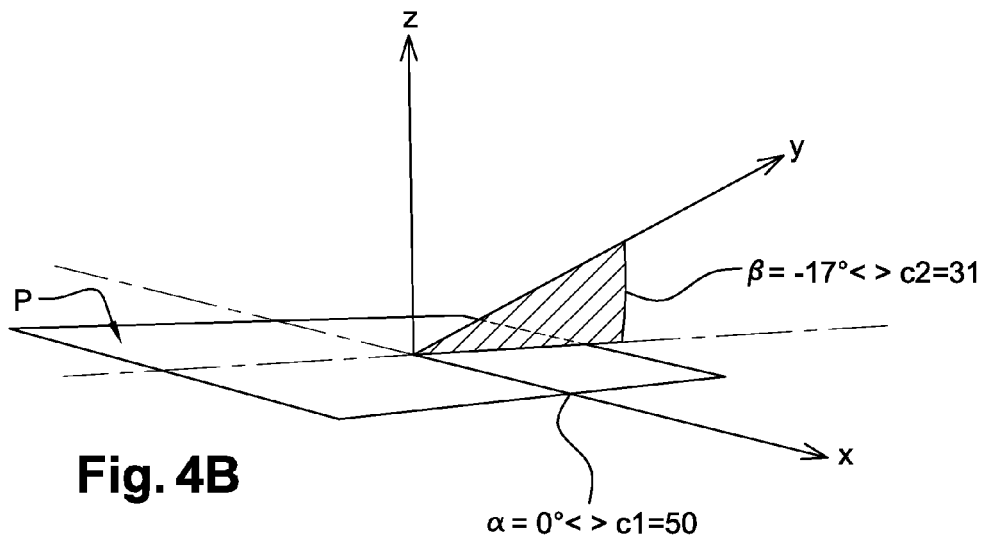

While the user is inclining the device 1, the display screen 10 of the device 1 displays the values of the successive pairs of intermediate codes (c1, c2) obtained from the successive pairs of measured angles of inclination α and β, in a step E5 concomitant with step E3. When the target position of inclination, for which the screen 10 displays the intermediate codes c1 and c2, which, concatenated with one another c1∥c2 form a final unlocking code K to be input, is achieved, the user once again presses the activation key T in order to validate the input of the unlocking code K, in a step E6. In this case, the measured angles α and β are −37° and −17°, respectively. The intermediate codes c1 and c2 generated from these angles α=−37° and β=−17° have respective values of "08" and "31". The final code K thus has a value of "0831". FIG. 4A shows the device 1, represented by the plane P, inclined at an angle α of −37° with respect to the x-axis, the angle β between the plane P and the y-axis having a value of 0°. FIG. 4B shows the device 1, represented by the plane P, inclined at an angle β of −17° with respect to the y-axis, the angle α between the plane P and the x-axis being 0°. For the sake of clarity, each of the two FIGS. 4A and 4B shows the inclination of the device 1 with respect to a single axis x or y. To input the code K, the device 1 must be inclined both at an angle α of −37° with respect to the x-axis and at an angle β of −17° with respect to the y-axis. As a variant, it is possible to envision inputting a code K in two steps:

a first step of inputting the code c1, by inclining the device at an angle α of −37° with respect to the x-axis, the angle β between the plane P and the y-axis being of any value, and validating the input by pressing the key T; and a second step of inputting the code c2, by inclining the device at an angle β of −17° with respect to the y-axis, the angle α between the plane P and the x-axis being of any value, and validating the input by pressing the key T.

In an alternative embodiment, once the target inclination position is reached, the user holds the portable device 1 in this inclined position during a pause time, greater than or equal to a threshold τ. For example, this threshold τ is 3 seconds. A test step is provided in which the device 1 detects whether this inclined position has been held for a time of T greater than or equal to the threshold τ. If the test is positive, in other words it is detected that the target has been held in the inclined position for a time greater than or equal to the threshold τ, the device 1 validates the input of the code K obtained by concatenation of the intermediate codes c1 and c2.

Next, the device 1 compares the input code K "0831" with the preconfigured unlocking code C stored in the memory 11 of the device 1, in a test step E7.

If the comparison is positive (branch Y in FIG. 1), or in other words if the input code K is equal to the pre-recorded unlocking code C, then the device 1 is unlocked, in a step E8, and it becomes possible to use it.

If the comparison is negative (branch N in FIG. 1), or in other words if the input code K is not equal to the configured unlocking code C, the device remains in the locked state, the input of the code having failed. The method then returns to step E1.

A limit could be placed on the number of possible failures which if exceeded would cause the device to change to a frozen state, unfreezing requiring for example an additional unfreezing code to be entered.

Figure 3:
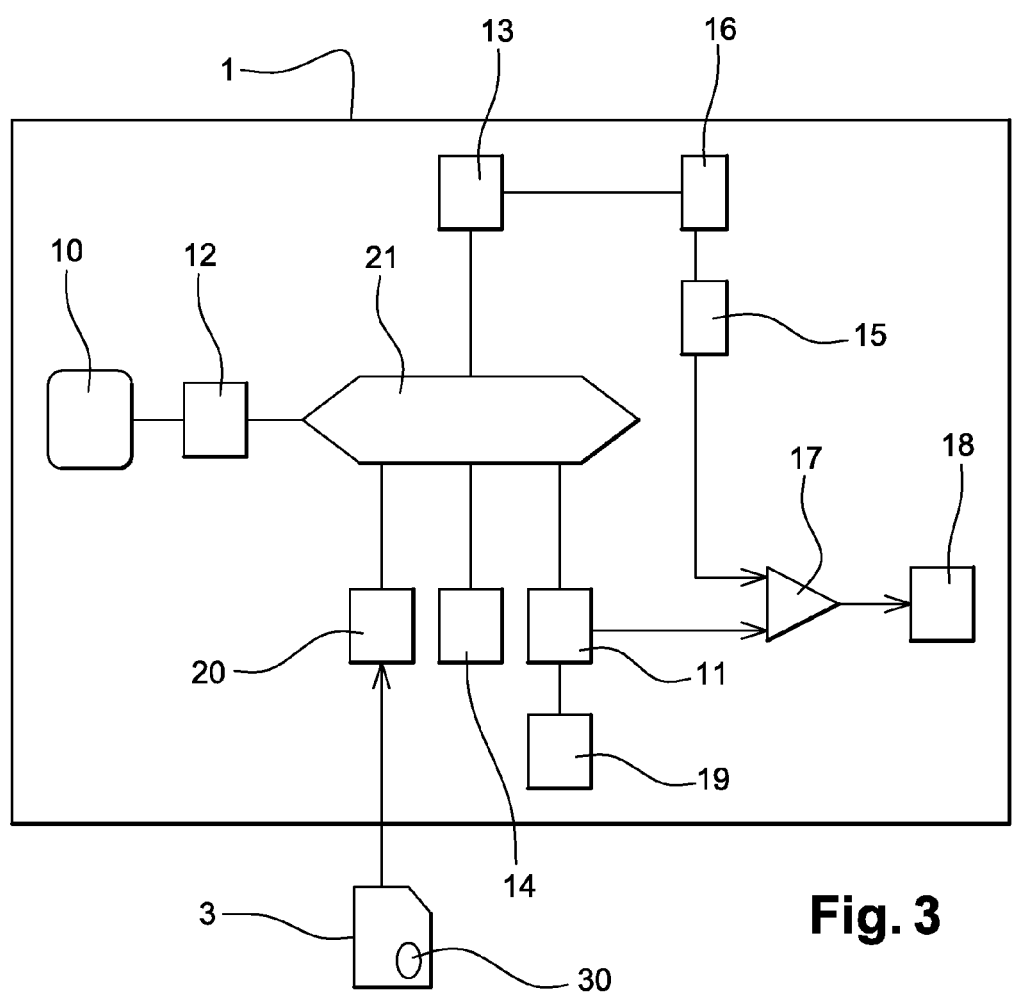
FIG. 3 shows a functional block diagram of a portable device able to implement the method in FIG. 1, according to the particular example embodiment.

The device 1 will now be described with reference to FIG. 3. For the sake of clarity, only the elements of the device 1 relating to the invention will be described here.

The device 1 comprises:
a touch-sensitive display screen 10;
a module 12 for managing the screen 10;
an internal memory 11;
an inclination sensor 13, in this case an accelerometer;
an activation key T 14;
two storage memories 11 et 15;
a module 16 for generating intermediate codes c1 and c2 and a final input code;
a comparator 17;
a locking/unlocking module 18;
a parameterizing module 19; and
a security card reader 20.

The management module 12 comprises a screen manager arranged to manage the display on the screen 10 and the input of information via the touch-sensitive screen 10. The management module 12 is especially arranged to manage and control the display of the intermediate codes c1 and c2 in step E5 of the method described above.

The parameterizing module 19 is arranged to parameterize the device 1. It especially allows a code C for unlocking the device 1, here configured by the user, to be configured by a user and stored in the memory 11.

The internal memory 11 is intended to store configuration parameters of the device 1. In particular, it is arranged to store the unlocking code C configured by the user.

The accelerometer 13 is arranged to measure the angles of inclination between a plane P in which the display screen 10 lies and, firstly, a reference axis x and, secondly, a reference axis y. The x- and y-axes are, in the particular example described here, two orthogonal axes forming a horizontal plane. The measured angle α is the angle between the plane P and the axis x. The measured angle β is the angle between the plane P and the axis y.

The activation key T is adapted for the implementation of steps E2 and E6 described above.

The module 16 is arranged to generate the intermediate codes c1 and c2 from the measured angles β and β, by implementing the calculation algorithm E4 described above with regard to the FIG. 2. The module 16 is thus arranged to implement step E4 of the process described above.

The storage memory 15, connected to the module 16 for generating the codes c1 and c2, is intended to store the final input code K, obtained by concatenation of the intermediate codes c1 and c2 corresponding to the target inclination position validated by the user pressing the activation key T. The target inclination position is validated by pressing on the key T, the module 16 is arranged to store the input code K in the memory 15.

The comparator 17, the inputs of which are connected to the memory 11 and to the memory 15, is arranged to compare the code C preconfigured by a user and stored in the memory 11 and the code K input and stored by the memory 15. The output of the comparator 17 is linked at the output to the module 18 for unlocking and locking the device 1. It is arranged, in the event of a positive comparison, to transmit an unlocking control signal to the module 18. The comparator 17 is arranged to implement step E7 of the method described previously.

The module 18 for locking/unlocking the device 1 is arranged to make the device change from a locked state to an unlocked state and, conversely, from an unlocked state to a locked state, on reception of corresponding control signals. The module 18 is arranged to implement step E8 of the method described above.

The device 1 also comprises a control module 21, in this case a microprocessor, to which all the elements of the device 1 are connected, and which is intended to control the operation of these elements.

The screen management module 12, the code generating module 16, the comparator 17 and the locking/unlocking module 18 are software modules comprising code instructions for implementing the corresponding steps of the method described above, when these software modules are executed by the microprocessor 21. The invention therefore also relates to a computer program comprising code instructions for implementing the steps of the method for inputting a code described above, when said program is executed by a processor.

The portable device that has just been described incorporates a display screen. As a variant, the portable device according to the invention could be without screen. In this case, the code or codes input could be displayed on a remote screen of another piece of equipment. For example, in the case where the portable device is a screenless remote control for a television set, the codes could be displayed on the television screen.

It is possible to envision implementing an analogous method for locking the device 1 or at least deactivating one or more functions of the device 1.

In the example that has just been described, the preconfigured code C is stored in a memory of the portable device 1. As a variant, the code C could be stored in an external memory, for example in a memory 30 of a security card 3, such as a SIM card, connected to the device 1.

The invention claimed is:

1. A method comprising:
inputting a numerical code using a portable device, the portable device being represented by a plane, in which the following acts are executed by the device:
measurement of a first angle of inclination of the plane of the portable device with respect to a first axis;
measurement of a second angle of inclination of the plane of the portable device with respect to a second axis; and
generation of a numerical input code from first and second intermediate codes corresponding to the first and second measured angles of inclination.

2. The method as claimed in claim 1, wherein the act of generation of the numerical input code comprises, for each of the first and second intermediate codes:
when the respective measured first or second angle lies within an angular range extending between −PA° and +PA°, PA being a preset angle, the respective intermediate code is generated by calculating the integer part of the sum of the measured angle and of the angle PA, multiplied by a fraction 50/PA.

3. The method as claimed in claim 2, in which, in the event that the respective measured angle is greater than or equal to the upper limit +PA° of the angular range, the respective intermediate code is set equal to 99.

4. The method as claimed in claim 3, in which, in the event that the respective measured angle is less than or equal to the lower limit −PA° of the angular range, the respective intermediate code is set equal to 00.

5. The method as claimed in claim 1, in which the first and the second axes are orthogonal and define a horizontal plane.

6. The method as claimed in claimed claim 1, in which the generation of an input code comprises concatenating the first and second intermediate codes to generate the numerical input code.

7. The method as claimed in claim 1, in which the portable device comprising a display screen lying in the plane, and the measured first and second angles each corresponds to an angle between the plane in which the screen lies and a respective reference axis.

8. The method as claimed in claim 1, further comprising:
unlocking the portable device, in which, an unlocking code being preconfigured, the following acts are provided:
comparing the input code with the preconfigured locking code; and
unlocking the portable device if the comparison is positive.

9. A portable device represented by a plane, the portable device comprising:
means for measuring a first angle of inclination of the plane of the portable device with respect to a first axis and a second angle of inclination of the plane of the portable device with respect to a second axis; and
means for generating a numerical input code based on first and second intermediate codes corresponding to the first and second measured angles of inclination measurement.

10. The device as claimed in claim 9, in which the means for generating an input code comprises, for each of the first and second intermediate codes:
means for generating the respective intermediate code, in the event that the respective first or second measured angle lies within an angular range extending between −PA° and +PA°, PA being a preset angle, to generate a code by calculating the integer part of the sum of the respective measured angle and of the angle PA, multiplied by a fraction 50/PA.

11. The device as claimed in claim 9, in which the means for generating an input code are arranged to concatenate the first and second intermediate codes in order to obtain the numerical input code.

12. The device as claimed in claim 9, further comprising means for comparing the input code and an unlocking code stored in memory, and means for unlocking the portable device if the comparison is positive.

13. A memory device comprising a computer program stored thereon and comprising code instructions for implementing an inputting method when said program is executed by a processor of a portable device, wherein the method comprises:
inputting a numerical code using the portable device, the portable device being represented by a plane, in which the following acts are executed by the processor:
measurement of a first angle of inclination of the portable device with respect to a first axis;
measurement of a second angle of inclination of the portable device with respect to a second axis; and
generation of a numerical input code from first and second intermediate codes corresponding to the first and second measured angles of inclination.

* * * * *